(12) United States Patent
Santos et al.

(10) Patent No.: US 9,644,935 B2
(45) Date of Patent: May 9, 2017

(54) SENSOR SYSTEM HAVING INDEPENDENT HALL EFFECT SENSOR

(71) Applicant: The Timken Company, North Canton, OH (US)

(72) Inventors: Alfred J. Santos, Keene, NH (US); Mark E. Lacroix, Winchester, NH (US); Lei Wang, Solon, OH (US)

(73) Assignee: The Timken Company, North Canton, OH (US)

( * ) Notice: Subject to any disclaimer, the term of this patent is extended or adjusted under 35 U.S.C. 154(b) by 55 days.

(21) Appl. No.: 14/353,922

(22) PCT Filed: Oct. 25, 2012

(86) PCT No.: PCT/US2012/061815
§ 371 (c)(1),
(2) Date: Apr. 24, 2014

(87) PCT Pub. No.: WO2013/063205
PCT Pub. Date: May 2, 2013

(65) Prior Publication Data
US 2014/0306692 A1    Oct. 16, 2014

Related U.S. Application Data

(60) Provisional application No. 61/551,501, filed on Oct. 26, 2011.

(51) Int. Cl.
*G01B 7/30* (2006.01)
*G01B 7/00* (2006.01)
(Continued)

(52) U.S. Cl.
CPC ............. *G01B 7/003* (2013.01); *G01D 5/145* (2013.01); *G01D 5/24428* (2013.01); *G01D 5/24461* (2013.01); *G01P 3/44* (2013.01)

(58) Field of Classification Search
CPC .... G01B 7/003; G01D 5/145; G01D 5/24428; G01D 5/24461; G01P 3/44
(Continued)

(56) References Cited

U.S. PATENT DOCUMENTS 6,772,648 B2    8/2004  Hwang
6,871,554 B2    3/2005  Duret et al.
(Continued)

FOREIGN PATENT DOCUMENTS

CN    101504292    8/2009
CN    201408199    2/2010
(Continued)

OTHER PUBLICATIONS

International Report on Patentability and Written Opinion for International Application No. PCT/US2012/061815 dated May 8, 2014 (9 pages).
(Continued)

*Primary Examiner* — Jay Patidar
(74) *Attorney, Agent, or Firm* — Michael Best & Friedrich LLP

(57) ABSTRACT

A sensor system for detecting at least one of a speed and a position of a rotatable member. The sensor system includes a high-resolution sensor circuit including a plurality of Hall effect sensors and at least one independent Hall effect sensor, wherein the independent Hall effect sensor includes at least one of a power supply line, a ground line, and an output line, none of which are connected to the high-resolution sensor circuit.

3 Claims, 2 Drawing Sheets

(51) Int. Cl.
*G01D 5/14* (2006.01)
*G01D 5/244* (2006.01)
*G01P 3/44* (2006.01)

(58) Field of Classification Search
USPC .................................................. 324/207.2
See application file for complete search history.

(56) References Cited

U.S. PATENT DOCUMENTS

| | | | |
|---|---|---|---|
| 7,093,505 B2 | 8/2006 | Denny et al. | |
| 7,106,053 B2 | 9/2006 | Desboilles | |
| 7,108,427 B2 | 9/2006 | Joki et al. | |
| 7,225,692 B2 | 6/2007 | Ulrici et al. | |
| 7,285,949 B2 | 10/2007 | Burns et al. | |
| 7,304,473 B2 * | 12/2007 | Kuroyanagi | G01D 5/24438 324/207.2 |
| 7,307,415 B2 | 12/2007 | Seger et al. | |
| 7,493,831 B2 | 2/2009 | Varonis | |
| 7,579,827 B2 | 8/2009 | Burns et al. | |
| 7,600,138 B2 | 10/2009 | Santos | |
| 7,780,357 B2 | 8/2010 | Varonis | |
| 7,902,820 B2 * | 3/2011 | Vervaeke | G01R 33/0094 324/207.2 |
| 7,999,533 B2 | 8/2011 | LaCroix | |
| 7,999,536 B2 | 8/2011 | Santos et al. | |
| 8,058,868 B2 | 11/2011 | Santos et al. | |

FOREIGN PATENT DOCUMENTS

| | | |
|---|---|---|
| CN | 201764980 | 3/2011 |
| EP | 0283291 | 9/1988 |
| EP | 0620647 | 10/1994 |
| EP | 1471331 | 10/2004 |
| EP | 1606589 | 6/2010 |
| FR | 2772912 | 6/1999 |
| WO | 2010/082086 | 7/2010 |
| WO | 2010117891 | 10/2010 |

OTHER PUBLICATIONS

Chinese Office Action for Application No. 201280052916.0 dated Aug. 26, 2015 (17 pages, English translation only).
EPO Communication for European Appl. No. 12791600.5, dated Dec. 3, 2015, 11 pages.
The Timken Company, "MPS160 Multiplying Encoder ASIC Device Specification," Oct. 16, 2008, retrieved from the Internet: URL:http://www.timken.com/EN-US/products/motion/products/speeddirection/Documents/mps-160-linear-encoder-asic-device-specification.pdf, [retrieved Jun. 10, 2015], 18 pages.

* cited by examiner

SENSOR SYSTEM HAVING INDEPENDENT HALL EFFECT SENSOR

CROSS-REFERENCE TO RELATED APPLICATIONS

This application claims priority to U.S. Provisional Patent Application No. 61/551,501 filed Oct. 26, 2011 and International Patent Application No. PCT/US2012/061815 filed Oct. 5, 2012, the contents of which are incorporated herein by reference in their entirety.

BACKGROUND

The present invention relates to sensors for movement of a shaft, in particular to an independent Hall effect sensor integrated into a chip having a plurality of Hall effect sensors.

SUMMARY

In one embodiment, the invention provides a sensor system for detecting at least one of a speed and a position of a rotatable member. The sensor system includes a high-resolution sensor circuit including a plurality of Hall effect sensors and at least one independent Hall effect sensor, wherein the independent Hall effect sensor includes at least one of a power supply line, a ground line, and an output line, none of which are connected to the high-resolution sensor circuit.

In another embodiment the invention provides a method of operating a position sensor system. The method includes steps of providing a high-resolution sensor circuit including a plurality of Hall effect sensors; providing at least one independent Hall effect sensor, wherein the independent Hall effect sensor includes at least one of a power supply line, a ground line, and an output line, none of which are connected to the high-resolution sensor circuit; placing the high-resolution sensor circuit in a low power consumption standby mode; powering the at least one independent Hall effect sensor; obtaining a reading from the at least one independent Hall effect sensor; and removing power from the at least one independent Hall effect sensor.

In yet another embodiment, the invention provides a method of operating a position sensor system. The method includes steps of providing a high-resolution sensor circuit including a plurality of Hall effect sensors; providing at least one independent Hall effect sensor, wherein the independent Hall effect sensor includes at least one of a power supply line, a ground line, and an output line, none of which are connected to the high-resolution sensor circuit; monitoring a first output signal from the high-resolution sensor circuit; determining a first number of signal transitions in the first output signal; monitoring a second output signal from the output line of the independent Hall effect sensor; determining a second number of signal transitions in the second output signal; and comparing the first number of signal transitions to the second number of signal transitions to determine if the high-resolution circuit has failed.

In still another embodiment, the invention provides a sensor system for detecting at least one of a speed and a position of a rotatable member. The sensor system includes a high-resolution sensor circuit including a plurality of Hall effect sensors and at least one independent Hall effect sensor, wherein the independent Hall effect sensor includes a power supply line and a ground line, neither of which is connected to the high-resolution sensor circuit, and wherein the power supply line is used as an output line.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
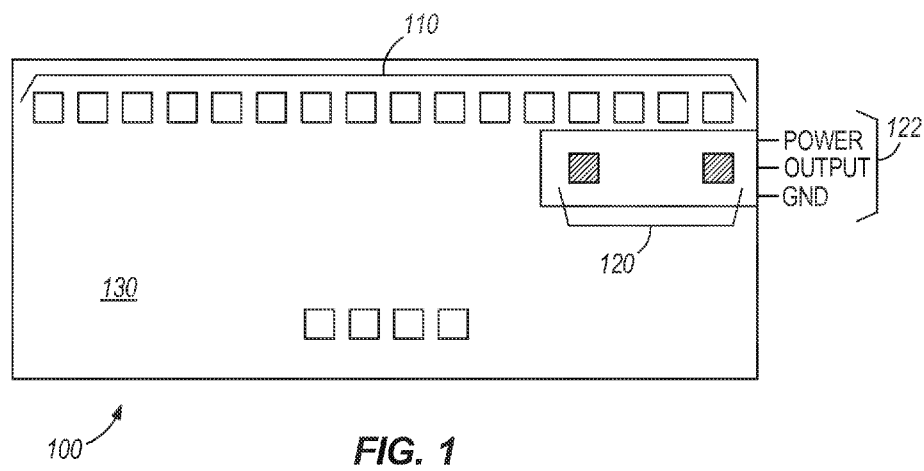
FIG. 1 shows a construction of a Hall effect sensor system including an independent Hall effect sensor.

In one construction, a Hall effect sensor system 100 includes a high resolution Hall effect sensor array 110 along with one or more independent Hall effect sensors 120 (FIG. 1). In one particular construction, the elements of the sensor system 100 are all contained on a single integrated circuit chip 130, i.e. fabricated on the same silicon chip. In further constructions, the independent Hall effect sensors 120 have power, output, and ground connections 122 that are separate from the connections to the high resolution Hall effect sensor array 110, i.e. none of the power, output, and ground connections 122 are connected to the high resolution Hall effect sensor circuit. Among the advantages of having separate power, output, and ground connections 122 is a reduced risk of electrostatic discharge (ESD) damage to both the high resolution 110 and the independent Hall effect sensors 120. The independent Hall effect sensors 120 can provide analog or digital output signals. In various constructions the high resolution Hall effect sensor array 110 may be similar to Timken model MPS32XF or MPS160, although the system 100 can be made using other high resolution Hall effect sensor arrays.

Figure 2:
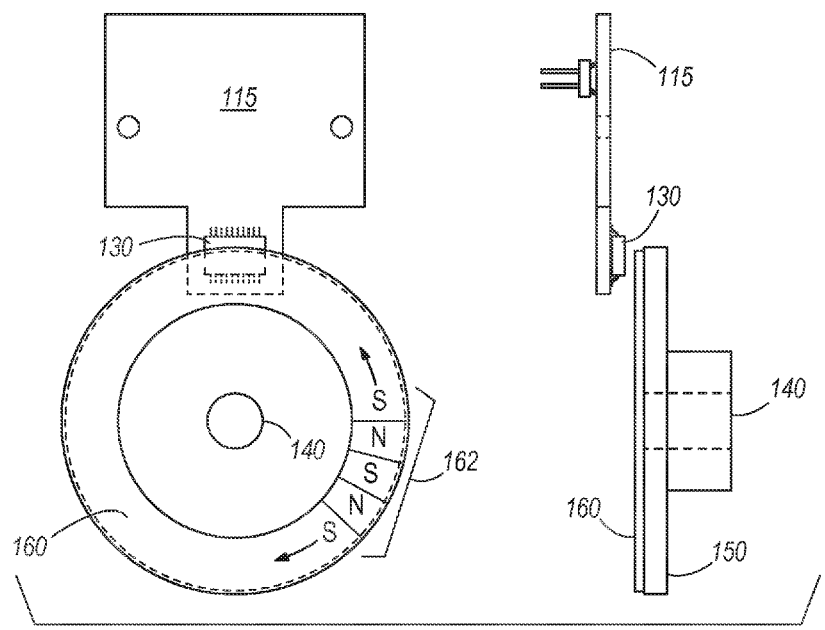
FIG. 2 shows a diagram of a high resolution Hall effect sensor system located adjacent to a rotatable member, e.g. a wheel or shaft, having layer of magnetic material with alternating magnetic poles affixed thereto for activating the sensors.

As noted above, the system 100 can be implemented on a single integrated circuit chip 130. The system 100 can be used with a rotatable member 140, e.g. a wheel or shaft, such as that shown in FIG. 2. FIG. 2 shows a circuit board 115 with the integrated circuit chip 130 mounted thereon. The high resolution sensor array 110 is disposed adjacent to a circular plate 150 having a magnetic region 160 at the outer edge with a plurality of alternating magnetic poles 162 embedded therein. The circular plate 150 may be attached to the rotatable member 140 or may be an integral part of the rotatable member 140.

Figure 3:
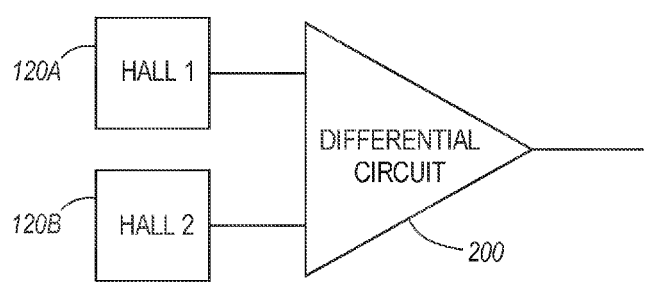
FIG. 3 shows a construction of an independent Hall effect sensor system in which the outputs of two Hall effect sensor elements are fed into a differential amplifier.
Figure 4:
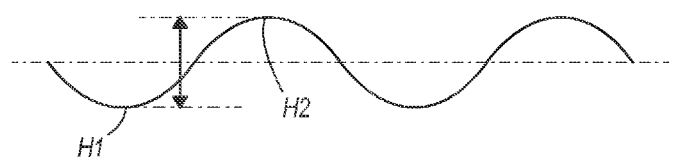
FIG. 4 shows a plot of the sinusoidal signal produced by a magnet on a turning rotatable member and the relative signals measured by first (H1) and second (H2) Hall effect sensors adjacent to the rotatable member as well as the difference in those signals.

In one construction, the system 100 includes two independent Hall effect sensors 120A, 120B on the integrated circuit chip 130 as shown in FIG. 1. The outputs of the two independent Hall effect sensors 120A, 120B may be fed into a differential amplifier 200 as shown in FIG. 3, which in some constructions is located on the integrated circuit chip 130. The output of the differential amplifier 200 is a digital 'on' or 'off' signal that depends on which of the two Hall effect sensors 120A, 120B has a more positive signal. For example, if the first Hall effect sensor 120A has a more positive signal than the second Hall effect sensor 120B, then the output of the differential amplifier 200 is on (or a '1'). Conversely, if the second Hall effect sensor 120B has a more positive signal than the first Hall effect sensor 120A, then the output of the differential amplifier 200 is off (or a '0') (FIG. 4).

An advantage of using a differential signal generated by a pair of sensors 120A, 120B is that the system 100 will be less sensitive to the effects of external fields or offset errors from the processing of the sensor chip, as common mode fields and chip level offsets are rejected when using a differential technique. Collecting a differential signal between the two independent Hall effect sensors 120A, 120B, rather than an absolute measurement value from one or both sensors, makes the overall system 100 less complex and less expensive to manufacture, since the sensors 120A, 120B do not have to be trimmed or otherwise adjusted prior to use. Instead the sensors 120A, 120B are separated from one another on the integrated circuit chip 130 by a predetermined fixed distance to facilitate their use with the differential amplifier 200 as described above. Among other considerations, the locations of the sensors 120A, 120B and the separation distance between them are determined by the arrangement of magnets associated with the rotatable member 140 that is being monitored.

As shown in FIG. 1, the independent Hall effect sensor elements 120 in various constructions are placed close to the high resolution Hall effect sensor array 110 on the integrated circuit chip 130 to allow the independent Hall effect sensors 120 to be triggered by the same magnet poles 162 on the rotatable member 140 which trigger the high resolution Hall effect sensor array 110.

In use, the incorporation of independent Hall effect sensors 120 facilitates reducing power consumption in the system 100. The system's 100 high resolution Hall effect sensor array 110 is used for functions such as determining the position of the rotatable member 140 associated with the system 100. However, many of the functions of the system 100, such as simply detecting whether the rotatable member 140 is rotating and at what speed, can be performed by one or two independent Hall effect sensors using far less power than is consumed by the high resolution Hall effect sensor array 110. Thus, the high resolution Hall effect sensor array 110 is often maintained in a standby mode in which the sensors and associated electronics are not powered or are maintained at a low power level. An additional advantage of using one or more independent Hall effect sensors 120 in conjunction with the high resolution Hall effect sensor array 110 is the generally faster power on response time of the independent sensors 120 compared to the high resolution Hall effect sensor array 110.

When relying on the independent Hall effect sensors 120 for monitoring movement of the rotatable member 140, power can be strobed to the sensors 120 to minimize power consumption. During strobing, power is sent to the sensors 120 just long enough to obtain a valid output signal, after which the sensors 120 are powered off. The frequency of strobing may be based on the maximum speed of the rotatable member 140 that is required to be detected.

Providing separate power, output, and ground connections 122 for the independent Hall effect sensors 120 allows the independent sensors 120 to be used to monitor the status and performance of the high resolution Hall effect sensor array 110. Signals can be monitored from both the independent Hall effect sensors 120 as well as from the high resolution Hall effect sensor array 110. Metrics from the signals (e.g. the number of transitions in the respective signals, or a ratio thereof) can be used to detect defective or failed sensors or sensor connections, or to detect sensors having intermittent performance problems. In some constructions, the output connection functions can be performed using the power connection, thereby combining these functions into a single line. Thus, by transmitting output signals using the power supply line, the independent Hall effect sensor 120 would only require two connections. Accordingly, in further constructions only two connections 122 (power and ground) may be provided for the independent Hall effect sensors 120.

Thus, the invention provides, among other things, a system and a method for using an independent Hall effect sensor. Various features and advantages of the invention are set forth in the following claims.

What is claimed is:

1. A sensor system for detecting at least one of a speed and a position of a rotatable member, the sensor system comprising:
   a single integrated circuit chip including
      a high-resolution sensor circuit including a plurality of Hall effect sensors; and
      at least one independent Hall effect sensor,
   wherein the independent Hall effect sensor includes at least one of a power supply line, a ground line, and an output line, none of which are connected to the high-resolution sensor circuit;
   wherein the at least one independent Hall effect sensor comprises at least two independent Hall effect sensors each having an output, wherein the outputs of the at least two independent Hall effect sensors are fed into a differential amplifier; and
   wherein the at least two independent Hall effect sensors include a first independent Hall effect sensor and a second independent Hall effect sensor, and wherein an output of the differential amplifier is digital on if the first independent Hall effect sensor has a more positive output signal than the second independent Hall effect sensor and the output of the differential amplifier is digital off if the second independent Hall effect sensor has a more positive output signal than the first independent Hall effect sensor.

2. The sensor system of claim 1, wherein power to the at least one independent Hall effect sensor is strobed.

3. The sensor system of claim 1, wherein the independent Hall effect sensor includes a ground line and a power supply line, and wherein the power supply line is used as an output line.

* * * * *